March 9, 1937.   E. E. WEMP   2,073,357
FLUID COUPLING AND CONTROL
Filed Feb. 15, 1934   2 Sheets-Sheet 1

INVENTOR.
ERNEST E. WEMP.
BY
ATTORNEYS.

March 9, 1937.  E. E. WEMP  2,073,357
FLUID COUPLING AND CONTROL
Filed Feb. 15, 1934    2 Sheets-Sheet 2

INVENTOR.
ERNEST E. WEMP
BY
Barnes, Kisselle & Laughlin
ATTORNEYS.

Patented Mar. 9, 1937

2,073,357

UNITED STATES PATENT OFFICE 2,073,357

FLUID COUPLING AND CONTROL

Ernest E. Wemp, Detroit, Mich.

Application February 15, 1934, Serial No. 711,364

23 Claims. (Cl. 192—.01)

This invention relates to a fluid clutch constructed so that it may be controlled so that the driving action may be discontinued. The clutch is one particularly useful in automotive vehicles employing speed change transmissions wherein the driving action is best discontinued or broken to permit gear change. In association with the fluid coupling a controlling mechanism is provided so that the coupling may be automatically established and broken under the control and at the will of an operator.

Figure 1:
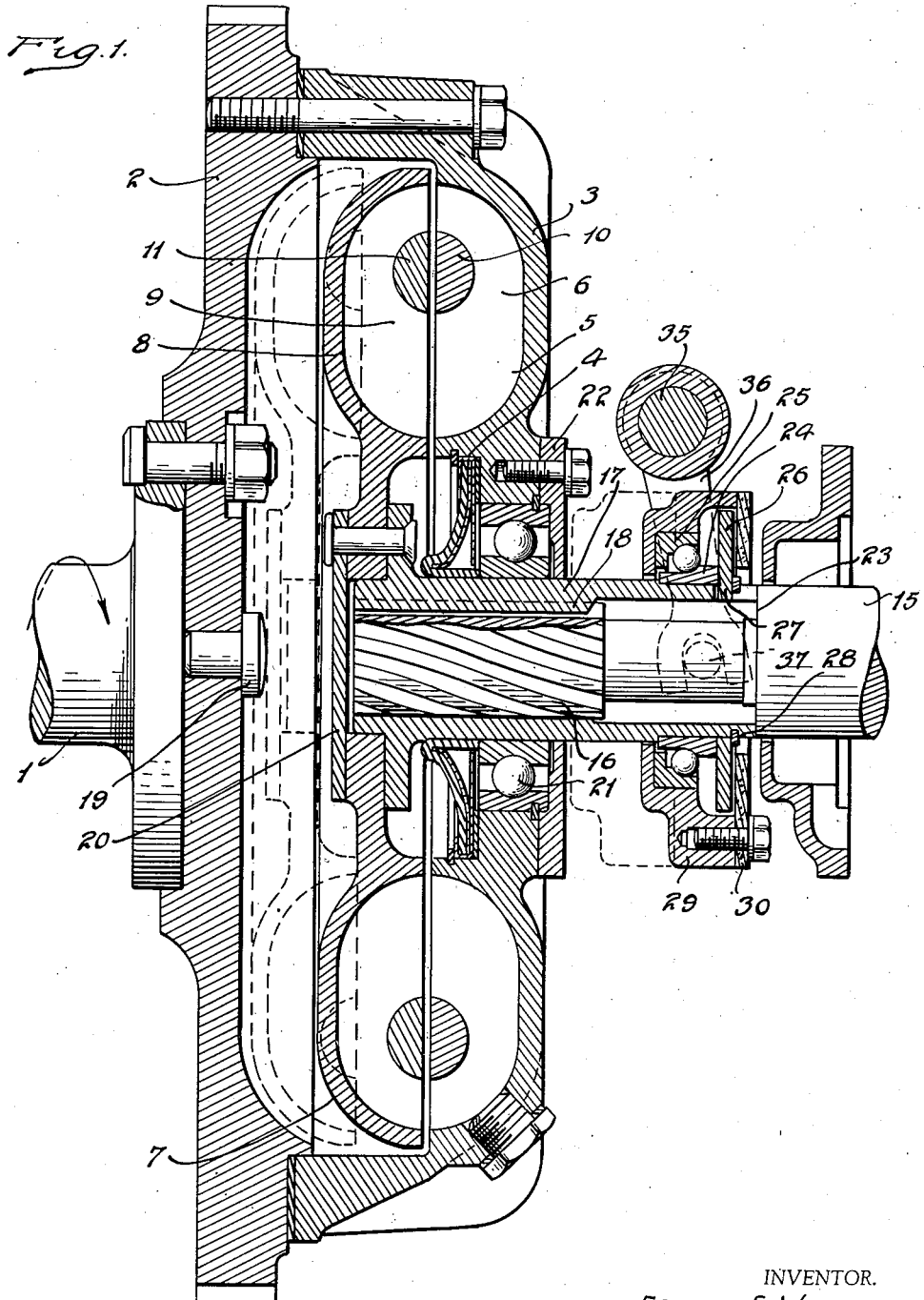
Fig. 1 is a vertical sectional view taken through a fluid coupling device constructed in accordance with the invention.

A crank shaft of an engine such as the usual internal combustion engine is shown at 1 fastened to which is a flywheel 2. The impeller of the fluid coupling may be in the form of a cover or housing 3 bolted to the flywheel and having an oil sealing device 4 so that a substantially fluid tight chamber is provided by the flywheel and impeller. The impeller may have a series of annularly arranged cavities 5 divided by radial vanes 6. A runner 7 likewise has a number of annularly arranged cavities 8 divided by radial vanes 9. This kind of a fluid coupling is old and well understood by those skilled in the art. The impeller and runner may each be provided with a core 10 and 11 each in the form of a half round ring disposed in substantially mating relation for directing the flow of liquid. As will be appreciated by those skilled in the art the chamber is to be filled with a suitable liquid such as oil or the like. The cavities of the impeller and runner form a vortex chamber and upon the rotation of the impeller or runner there is created a rotating movement of the oil in the vortex chamber and the liquid, impinging upon the vanes of the other member, sets said other member in motion. In normal operating conditions the impeller and runner are disposed in slightly spaced relation as indicated by the full lines in Fig. 1.

A driven shaft is illustrated at 15 and its forward end may be of reduced diameter and as shown herein is provided with a spiral spline formation 16. The runner 7 is attached to a hub 17 having internal spiral splines 18 mounted upon the spline formation 16. A stop member 19 which may be in the form of a hardened button may be carried by the flywheel and the runner may have a central part 20 in the form of a plate for contacting with this stop member as will later appear. A suitable bearing 21 may be disposed between the impeller and the hub for piloting the same and a closure plate 22 may be fastened to the impeller.

The hub 17 may be in the form of a sleeve with its rear end arranged to abut against a shoulder 23 on the driven shaft. A thrust bearing may be associated with the hub member having an inner race 24 associated with the hub substantially against axial movement with respect thereto and having an outer race 25. A friction plate 26 may be fastened to the hub by a tongue 27 held in place by a locking ring 28. A sort of housing structure is situated over this thrust bearing having a main housing portion 29 slidable axially with respect to the outer race of the bearing and having fastened thereto a friction disc 30 which overlaps the friction plate 26. A controlling rock shaft is illustrated at 35 and provided with a fork 36 the ends of which may be bifurcated as shown and fitted over studs or projections 37 on the housing 29.

If this fluid coupling is not controlled through the means of the rock shaft and other associated parts the action is substantially as follows: During operation with torque transmitted from the shaft 1 to the shaft 15 the fluid action in the vortex chamber rotates the runner, and due to the screw action of the spiral splines, the runner is fed and/or held rearwardly with its hub abutting against the shoulder 23. When the shaft 15 tends to overrun the shaft 1 the runner tends to transmit rotary action to the impeller and it is fed forwardly due to the spline until it is stopped by contact of the plate 20 with the button 19. This, of course, separates the two halves of the vortex chamber and the oil or other liquid, previously between the flywheel and the runner, passes in between the runner and the impeller, the runner being in the dotted line position as shown in Fig. 1. This substantially destroys the vortex action due to the cushion of oil between the impeller and runner, with the result that the runner and driven shaft may overrun the impeller and shaft 1. Means are provided for causing or aiding the reverse movement of the runner when the drive shaft and impeller exceeds the speed of rotation of the runner and driven shaft, and this means resides in some of the control mechanism now to be described.

Figure 2:
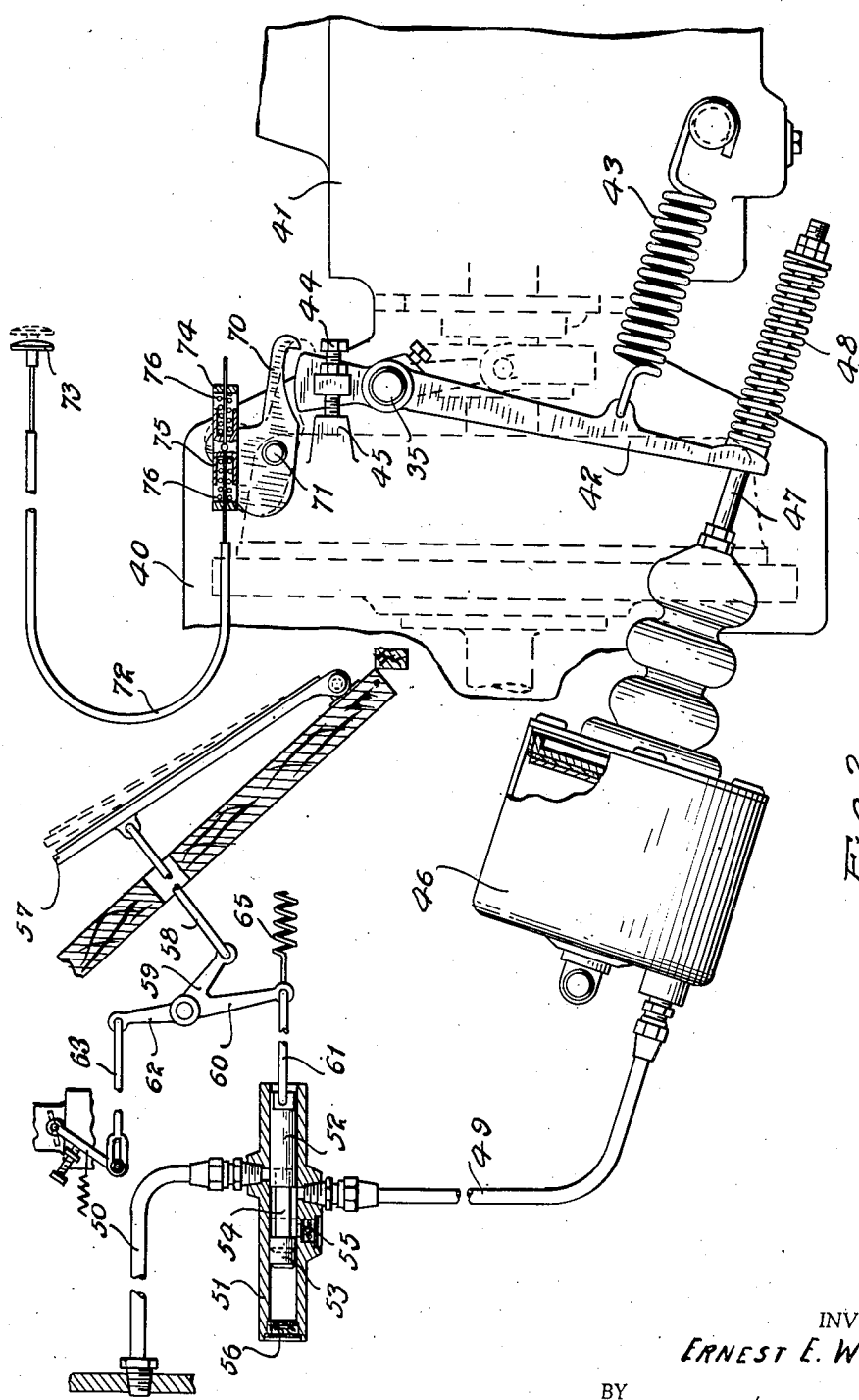
Fig. 2 is a view showing the installation as it may appear in an automobile and illustrating a controlling mechanism with some parts shown in section.

In Fig. 2 a clutch housing is shown at 40 in which the fluid coupling may be located as illustrated and attached to the housing may be the usual transmission gear housing 41. An arm 42 is fastened to the controlling rock shaft 35 and it is acted upon by a return spring 43. An adjustable stop 44 may be carried by the arm for abutting against a fixed abutment 45. A vacuum cylinder which may have a diaphragm or piston therein and which is shown at 46 may have a piston rod 47 extending through the arm 42 and associated therewith through the means of a compression spring 48. This cylinder is to be connected to a source of vacuum, such as the intake manifold of the vehicle engine, by pipe lines 49 and 50 between which is a controlling valve. This valve may be in the form of a cylinder block 51 having a valve member therein with a portion 52 and a portion 53 nicely fitting the cylinder and having a reduced part 54. The cylinder block may have a bleeder port 55, and one end, as at 56, may be open to the atmosphere, and as shown suitable air straining devices may be located in the bleeder port and end 56. The pipe lines 49 and 50 connect into the cylinder block as shown. The accelerator or throttle control for a car is illustrated at 57, for foot operation, having a rod 58 extending through the toe boards of the car and connected to an arm 59 of a rocking member. This member has an arm 60 which may connect by a link 61 with the valve, and it may have an arm 62 from which a link 63 may extend to the throttle valve for the engine. A suitable light return spring may be used for normally holding the accelerator in elevated position as regards the toe boards which is the idling condition of the engine.

Now again picking up the operation: In normal operating position the runner takes the full line position as illustrated in Fig. 1. The control mechanism takes the position as illustrated in Fig. 2. If the operator desires to decelerate the vehicle using the motor as a braking agency the accelerator is allowed to retract to the full-line position of Fig. 2 at which time the throttle is substantially positioned for engine idling speed. Torque is now transmitted from the driven shaft to the driving shaft and the tendency is to feed the runner forwardly and away from the impeller. The spring 43 however is strong enough to overcome this tendency so that the runner is prevented from separating from the impeller and the fluid coupling remains effective. The torque transmitted under such a condition is only about 30% or 40% of the maximum torque capacity of the engine so that the spring 43 need only to have a load capacity to overcome this amount of torque. It will be noted that at this time the valve is positioned so that the vacuum cylinder is open to the atmosphere through the bleeder port 55. Now if the operator desires a free wheeling action in which the vehicle and driven shaft 15 overrun the engine, the accelerator is permitted to retract to the dotted line position. It will be understood that there may be a lost motion movement so far as the throttle of the engine is concerned as shown in Fig. 2. This shifts the valve to the dotted line position as shown and connects the vacuum cylinder to the vacuum line 50. The cylinder then is exhausted of air and the arm 42 is shifted clockwise as Fig. 2 is viewed, against the action of the spring 43. The spring 48 is srong enough to do this. Thus two agencies may aid in shifting the impeller to the dotted line position, one the vacuum action on the arm 42, and the other the feeding movement of the spiral splines. The vehicle may now overrun the engine. This same performance may be effected to change gears and as soon as the fluid coupling opens up the gear change may be made. Upon depressing the accelerator the valve is closed and the cylinder 46 is quickly opened to the atmosphere. Two agencies may take part in returning the runner to its operating position, one of which is the spring 43, and the other of which is the feeding action of the spiral splines, the effect of which increases as the runner approaches the impeller.

In making a gear change it is desirable that the shaft 15 be substantially decelerated but the momentum of the runner together with whatever drag there may be on the runner by the fluid in the coupling may tend to keep the runner and shaft 15 rotating for a while. However, friction braking means is provided to quickly decelerate the runner. To make a gear change the operator permits the throttle to move to the dotted line position and then as explained above, the runner shifts to the dotted line position shown in Fig. 1. It strikes the button 19 where it is positively positioned but the spring 43 continues to act on the bearing. The result is that the housing 29 shifts forwardly with respect to the thrust bearing and the plate 30 which is held from rotary movement by the housing frictionally contacts with the plate 26. This applies a brake, so to speak, and quickly decelerates the runner and shaft 15. The disc 30 may be of suitable friction material such as graphite bronze or it may be faced with a suitable fabric or molded friction material. When, however, the coupling is in operating condition there is a definite clearance between the plates 26 and 30. In order to relieve the thrust bearing of pressure during operating conditions the stops 44 and 45 are provided. This stop arrangement takes the force applied by spring 43 and thus relieves the bearing. Thrust forces are localized in the hub member of the runner and the shaft 15. The rearward thrust of the runner during operating conditions is taken at the shoulder 23 of the driven shaft; the driven shaft, as is understood by those skilled in the art, is mounted in a bearing just inside the transmission housing and this bearing preferably is of such specifications as to amply take care of the thrust. When the torque is from the driven shaft the thrust is taken by the thrust bearing which holds the runner in position by the action of spring 43.

There are times perhaps when the load value of the spring 43 will not be sufficient to keep the runner in operating position as regards the impeller when the torque is delivered from the driven shaft. This may be for example, when the car is being towed or pushed while in gear for the purpose of starting the engine. To meet this condition a locking device is provided. This may take the form of a latch 70 pivoted as at 71 and having a hooked end for hooking over the upper end of the arm 72 as illustrated by the dotted lines in Fig. 2. This latch is under the control of the operator and such control may take the form of a Bowden wire 72 running to the instrument panel or dash of the vehicle where it is equipped with a finger piece 73. A spring connection between the Bowden wire and the latch 70 may be provided and which may take the form of a housing like element 74 fastened to the latch and slidably holding a block 75 mounted between coil springs 76 located between the block and the ends of the housing. When this latch is effective the runner is positively held in its operative position.

It will be noted that the structure herein provides in an automotive vehicle for free wheeling action without employing a separate one-way drive connection commonly termed a free wheeling unit. This free wheeling action is directly under the control of the operator and may be used as a straight free wheeling action and also used for gear shifting purposes.

The general operation may be reiterated as follows: When the engine is driving the car normally the fluid coupling takes the position shown in Fig. 1 and the various elements shown in Fig. 2 take the position illustrated with the exception that the accelerator pedal 57 may be further depressed to open the throttle valve. However, this further depression of the throttle 57 does not change the vaccum conditions as the part 52 of the valve keeps the lines 49 and 50 closed off from each other. To shift gears the operator allows the accelerator pedal 57 to move into the dotted line position opening the vacuum line, and the runner 7 moves to the dotted line shown in Fig. 1, and the coupling is broken. A gear shift is now made, and after the shift is made the accelerator is depressed, thus closing off the vacuum line and opening the cylinder to the atmosphere, and then the impeller moves back to the full line position shown in Fig. 1 partly by the action of the springs 43 and partly by the driving action on the splines 16, or by both of these forces working together. Any time the operator desires free wheeling action, the accelerator is allowed to assume the dotted line position. When it is desired that the fluid coupling be held in operative condition, the button 73 is actuated to position the catch 70 over the end of the lever 42, and in this condition the vehicle may be pushed or towed to transmit torque to the engine to start the same.

In some of the claims appended hereto one fluid coupling element is referred to as an impeller and the other as a runner. These words are used, as it is convenient to employ the different terms for the purpose of clearness. It is to be understood, however, that the terms are interchangeable. It is to be understood that the element referred to as the impeller may be the driven member of the fluid coupling, and the element referred to as the runner may be the driving member. In fact this condition exists in applicant's arrangement when the torque is reversed and the driven shaft drives the driving shaft.

I claim:

1. A fluid coupling comprising an impeller, a runner, a driven shaft, and a connection between the runner and the driven shaft including inclined plane means arranged to feed the runner axially toward the impeller when torque is delivered from the impeller, and to feed the runner axially away from the impeller to break the coupling when the driven shaft tends to overrun the impeller.

2. A fluid coupling comprising an impeller, a runner, a driven shaft, and a connection between the runner and the driven shaft including inclined plane means arranged to feed the runner axially toward the impeller when torque is delivered from the impeller, and to feed the runner axially away from the impeller to break the coupling when the driven shaft tends to overrun the impeller, and stop means for limiting the axial movement of the runner toward and away from the impeller.

3. A fluid coupling comprising an impeller, a runner, a driven shaft, and a connection between the runner and the driven shaft including inclined plane means arranged to feed the runner axially toward the impeller when torque is delivered from the impeller, and to feed the runner axially away from the impeller to break the coupling when the driven shaft tends to overrun the impeller, and friction braking means which becomes effective when the runner has moved away from the impeller to decelerate the same.

4. A fluid coupling comprising an impeller, a runner, a driven shaft, said driven shaft having spiral splines thereon, a hub for the runner having internal spiral splines interfitting with the splines on the driven shaft, said spiral splines extending in a direction so as to tend to feed the runner axially of the driven shaft toward the impeller when torque is delivered from the impeller, and to feed the runner away from the impeller to break the coupling when the driven shaft tends to overrun the impeller.

5. A fluid coupling comprising a flywheel or the like, an impeller attached to the flywheel and forming together with the flywheel a fluid chamber, a runner in the chamber, a driven shaft extending into the chamber, spiral splines interconnecting the runner and driven shaft and extending in the direction to feed the runner axially of the driven shaft toward the impeller when the impeller overruns the driven shaft, and to feed the runner away from the impeller toward the flywheel when the driven shaft tends to overrun the impeller, a stop device carried by the flywheel for limiting movement of the runner away from the impeller, and stop means on the driven shaft for limiting movement of the runner toward the impeller.

6. A fluid coupling comprising a flywheel or the like, an impeller attached to the flywheel and forming together with the flywheel a fluid chamber, a runner in the chamber, a driven shaft extending into the chamber, spiral splines interconnecting the runner and driven shaft and extending in the direction to feed the runner axially of the driven shaft toward the impeller when the impeller overruns the driven shaft and to feed the runner away from the impeller toward the flywheel when the driven shaft tends to overrun the impeller, a stop device carried by the flywheel for limiting movement of the runner away from the impeller, and stop means on the driven shaft for limiting movement of the runner toward the impeller, said last named stop means being in the form of a shoulder on the driven shaft.

7. A fluid flywheel comprising an impeller, a runner, a drive shaft, spiral splines connecting the runner and driven shaft extending in a direction so as to shift the runner axially toward the impeller when driving force is communicated from impeller to runner and to shift the runner axially away from the impeller when the driven shaft overruns the impeller, spring means normally holding the runner in close proximity to the impeller, and power control means for overcoming the action of said spring and tending to shift the runner away from the impeller.

8. For an automotive vehicle, the combination of a fluid coupling having an impeller and a runner, a driven shaft, spiral splines connecting the runner and driven shaft extending in a direction so as to tend to shift the runner axially toward the impeller during driving action of the impeller and to shift the runner axially away from the impeller when the driven shaft overruns the impeller, spring means for holding the runner in close proximity to the impeller to normally prevent the vehicle from overrunning the impeller, a vacuum cylinder for connection to the engine manifold and operable to overcome said spring, and an operator controlled valve for controlling the connection of the cylinder to the engine intake manifold.

9. For an automotive vehicle, the combination of a fluid coupling having an impeller and a runner, a driven shaft, spiral splines connecting the runner and driven shaft extending in a direction so as to tend to shift the runner axially toward the impeller during driving action of the impeller and to shift the runner axially away from the impeller when the driven shaft overruns the impeller, spring means for holding the impeller in close proximity to the runner to normally prevent the vehicle from overrunning the impeller, a vacuum cylinder for connection to the engine manifold and operable to overcome said spring, a valve for controlling the connection of the cylinder to the intake manifold, an operator controlled accelerator for the vehicle engine, and means connecting the accelerator to the valve arranged to establish the connection between the cylinder and the intake manifold when the accelerator is positioned substantially for idling speed of the engine.

10. For an automotive vehicle, the combination of a fluid coupling having an impeller and a runner, a driven shaft, spiral splines connecting the runner and driven shaft extending in a direction so as to tend to shift the runner axially toward the impeller during driving action of the impeller and to shift the runner axially away from the impeller when the driven shaft overruns the impeller, spring means normally holding the runner in close proximity to the impeller, means for overcoming said spring to permit runner movement away from the impeller, and a positive locking device for locking the runner against movement away from the impeller.

11. For an automotive vehicle, the combination of a fluid coupling having an impeller and a runner, a driven shaft, spiral splines connecting the runner and driven shaft extending in a direction so as to tend to shift the runner axially toward the impeller during driving action of the impeller and to shift the runner axially away from the impeller when the driven shaft overruns the impeller, spring means normally holding the runner in close proximity to the impeller, means for overcoming said spring to permit runner movement away from the impeller, a positive locking device for locking the runner against movement away from the impeller and operator controlled means for controlling said locking device.

12. For an automotive vehicle, the combination of a fluid coupling having an impeller and a runner, a driven shaft, spiral splines connecting the runner and driven shaft extending in a direction so as to tend to shift the runner axially toward the impeller during driving action of the impeller and to shift the runner axially away from the impeller when the driven shaft overruns the impeller, a thrust bearing associated with the runner and movable therewith, spring means acting through the thrust bearing normally holding the runner in close proximity to the impeller, means for overcoming the spring to permit axial shift of the runner away from the impeller, and stop means for taking the load of said spring to relieve the thrust bearing when the runner is in close proximity to the impeller.

13. For an automotive vehicle, a fluid coupling having an impeller, a runner shiftable axially toward and away from the impeller to render the fluid coupling effective and ineffective, means for holding the runner in close proximity to the impeller, means under the control of an operator for overcoming the previously mentioned means for movement of the runner away from the impeller to break the coupling, and cooperating friction members, one of which rotates with the runner and another of which is relatively fixed and arranged to be brought into frictional engagement by the actuation of the operator controlled means to decelerate the runner when it has moved away from the impeller.

14. For an automotive vehicle, the combination of a fluid coupling having an impeller and a runner, a driven shaft, means mounting the runner on the driven shaft whereby the same may shift axially toward and away from the impeller to render the coupling effective and ineffective, a thrust bearing associated with the runner, a retracting spring, means interconnecting the spring and thrust bearing whereby the spring normally holds the runner in close proximity to the impeller, a vacuum cylinder having a moving part connected to the means which interconnects the retracting spring and thrust bearing, a vacuum line for connecting the cylinder to the engine intake manifold, a control valve in the line, said vacuum cylinder being effective to overcome the retracting spring and to shift the runner away from the impeller, friction braking members, one of which rotates with the impeller and one of which is fixed relatively thereto, normally separated when the runner is in close proximity to the impeller, said braking members being brought together for frictional engagement under the force of the vacuum cylinder to decelerate the runner when it has shifted away from the impeller.

15. In a fluid coupling, an impeller, a runner axially shiftable toward and away from the runner to make and break the fluid coupling, controlling means for runner movement, a thrust bearing through which the controlling means operates, a housing for the thrust bearing connected to the controlling means, said housing being capable of axial movement relative to the thrust bearing, a friction member associated with the housing, another friction member rotatable with the runner, said friction members being spaced apart when the runner is in close proximity to the impeller, said friction members being brought into engagement by the force of controlling means when the runner has shifted away from the impeller whereby to decelerate the runner.

16. For an automotive vehicle, the combination of a fluid coupling having an impeller and a runner, said runner being arranged to shift toward and away from the impeller to make and break the fluid coupling, means for normally holding the runner in close proximity to the impeller to render the fluid coupling effective, and means under the control of an operator for effecting shift of the runner away from the impeller to render the fluid coupling ineffective.

17. For an automotive vehicle, the combination of a fluid coupling having an impeller and a runner, said runner being arranged to shift toward and away from the impeller to make and break the fluid coupling, means for normally holding the runner in close proximity to the impeller to render the fluid coupling effective, means under the control of an operator for effecting shift of the runner away from the impeller to render the fluid coupling ineffective, and a braking agency normally ineffective when the runner is in close proximity to the impeller and rendered effective by the means under the control of the operator to decelerate the runner when it has shifted away from the impeller.

18. A fluid coupling comprising, an impeller member, a runner member, inclined plane means associated with one of the members for shifting the same axially toward the other member when the applied torque is in in one direction and for shifting said one member away from the other member when the torque is reversed, whereby to render the coupling effective and ineffective, respectively.

19. A fluid coupling comprising an impeller member, a runner member, a driving shaft connected to one member, a driven shaft connected to the other member, the connection between one of said shafts and its respective member including inclined plane means arranged to feed the member so connected to its shaft axially toward the other member when the torque is delivered from the driving shaft to the driven shaft to render the fluid coupling effective and to feed said member so connected to its shaft axially away from the other member to render the fluid coupling substantially ineffective when the torque is delivered from the driven shaft to the driving shaft.

20. A fluid coupling comprising an impeller member, a runner member, a driving shaft connected to the member, a driven shaft connected to the other member, the connection between one of said shafts and its respective member including inclined plane means arranged to feed the member so connected to its shaft axially toward the other member when the torque is delivered from the driving shaft to the driven shaft to render the fluid coupling effective and to feed said member so connected to a shaft axially away from the other member to render the fluid coupling substantially ineffective when the torque is delivered from the driven shaft to the driving shaft, and means for locking said shiftable member against such axial shifting and in close proximity to the other member to maintain the fluid coupling effective irrespective of the direction of torque.

21. A fluid coupling comprising an impeller, a runner, a driven shaft, a connection between the runner and the driven shaft including inclined plane means arranged to feed the runner axially toward the impeller when the torque is delivered from the impeller, and to feed the runner axially away from the impeller to break the coupling when the driven shaft tends to overrun the impeller, and means in addition to the inclined plane means for aiding in shifting the runner away from the impeller.

22. A fluid coupling comprising an impeller member, a runner member, a driving shaft connected to one member, a driven shaft connected to the other member, the connection between one of said shafts and its respective member including inclined plane means arranged to feed the member so connected to its shaft axially toward the other member when the torque is delivered from the driving shaft to the driven shaft to render the fluid coupling effective and to feed said member so connected to its shaft axially away from the other member to render the fluid coupling substantially ineffective when the torque is delivered from the driven shaft to the driving shaft, and means in addition to the inclined plane means for aiding in shifting the said member so connected to its shaft away from the other member.

23. In combination with an engine in an automotive vehicle and having a driving shaft, of a driven shaft, a fluid coupling comprising, an impeller member, a runner member, one member being connected to the driving shaft and the other member being connected to the driven shaft, the connection between one of said shafts and its respective member including inclined plane means arranged to feed the member so connected to its shaft axially toward the other member when the torque is delivered from the driving shaft to the driven shaft to render the fluid coupling effective and to feed said member so connected to its shaft axially away from the other member to render the fluid coupling substantially ineffective when the torque is delivered from the driven shaft to the driving shaft, and means for holding the said member which is so connected to its shaft away from the other member when the vehicle and the driven shaft are substantially at rest and when the engine and the driving shaft are operating at substantially idling speed.

ERNEST E. WEMP.